United States Patent [19]

Uchida

[11] Patent Number: 4,806,775
[45] Date of Patent: Feb. 21, 1989

[54] IMAGE READING SYSTEM USING AN LED ARRAY

[75] Inventor: Satoru Uchida, Atsugi, Japan

[73] Assignee: Ricoh Company, Ltd., Tokyo, Japan

[21] Appl. No.: 143,664

[22] Filed: Jan. 14, 1988

[30] Foreign Application Priority Data

Jan. 14, 1987 [JP] Japan ............................ 62-2818[U]
Feb. 24, 1987 [JP] Japan ................................ 62-40690

[51] Int. Cl.$^4$ ............................................ H01J 40/14
[52] U.S. Cl. .................................... 250/578; 358/293; 355/68
[58] Field of Search ................ 250/578, 216; 358/293, 358/294; 355/68

[56] References Cited

U.S. PATENT DOCUMENTS

4,433,908 2/1984 Omi et al. ............................. 355/68
4,636,063 1/1987 Takai et al. ........................... 355/68
4,680,644 7/1987 Shirato et al. ...................... 358/294
4,699,502 10/1987 Araki et al. ........................... 355/68

Primary Examiner—David C. Nelms
Assistant Examiner—William L. Oen
Attorney, Agent, or Firm—Oblon, Fisher, Spivak, McClelland & Maier

[57] ABSTRACT

An image reading system for optically reading an original includes a convergent type light-emitting diode array as a light source, a white level reference and an image sensor disposed opposite to the white level reference. The light emitted from the LED array has a light intensity distribution which reduces in level in a transverse direction from an irradiation axis. The LED array is preferably so disposed with its irradiation axis passing a mid-point between the white level reference and an intersection point between an original surface travelling line and a straight line extending between the white level reference and the image sensor.

12 Claims, 11 Drawing Sheets

IMAGE READING SYSTEM USING AN LED ARRAY

BACKGROUND OF THE INVENTION

1. Field of the Invention

This invention generally relates to an optical image reading system for optically reading an original image for use in a facsimile machine or the like, and, in particular, to an image reading system using a light-emitting diode array as a light source.

2. Description of the Prior Art

An image reading system for reading an original image is used in various apparatuses, such as facsimile machines. In such an image reading system, a white level reference is typically provided for reflecting light from a light source, so that the light intensity level of the light reflecting from the white level reference is used as a reference to set a white level of the surface of the original to be read. In such an image reading system, use has been typically made of a fluorescent lamp tubular in shape as a light source. Since the fluorescent lamp is relatively large in size, its use tends to prohibit to make the entire image reading system compact in size. To cope with this problem, it has been proposed to use a light-emitting diode array as a light source; however, if use is made of a light-emitting diode of the divergent type as a light source in an image reading system, the light intensity level tends to be insufficient as compared with a light source, such as a fluorescent lamp. Accordingly, if use is made of a light-emitting diode as a light source of an image reading system, use must be made of a light-emitting diode of the non-divergent type or convergent type, which emits light substantially in parallel or in a convergent manner.

Figure 5:
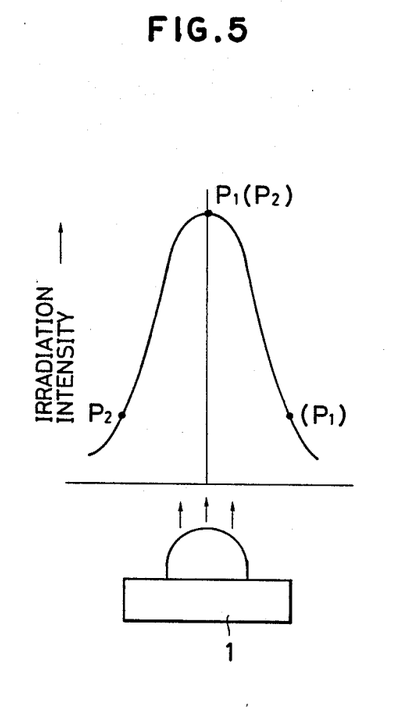
FIG. 5 is an illustration which is useful for explaining how a difference in detected light intensity level is produced depending on the orientation of the light-emitting diode 1.
Figure 6:
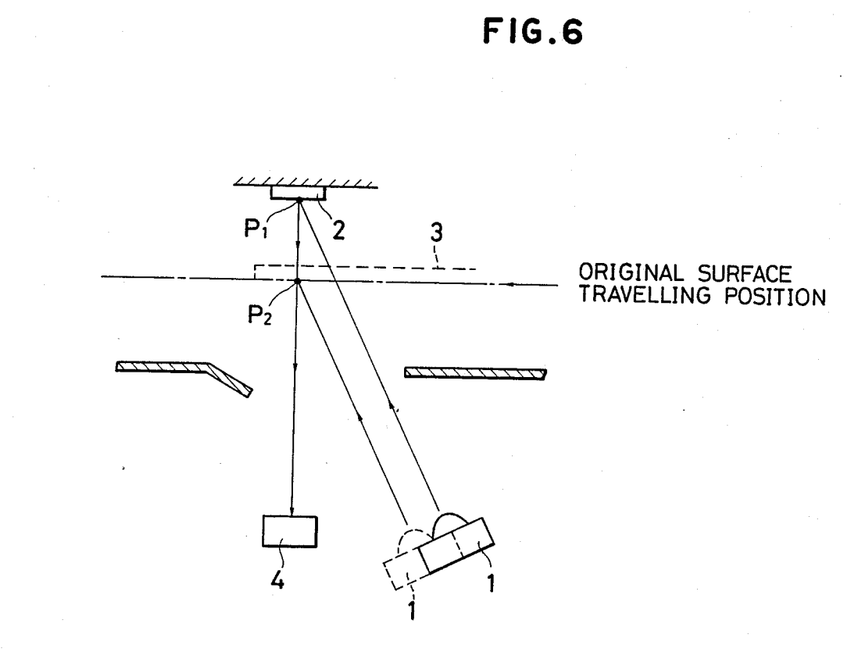
FIG. 6 is a schematic illustration showing how an error can be produced depending on the positioning of a light-emitting diode when used as a light source in an image reading system.
Figure 7:
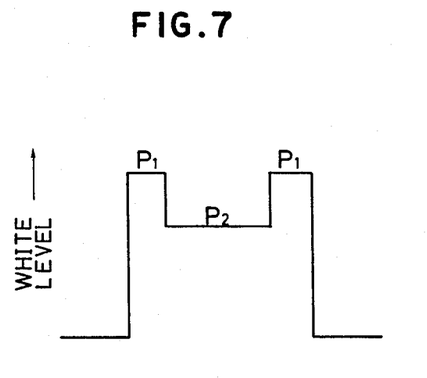
FIGS. 7 and 8 are illustrations which are useful for understanding the characteristic of the structure shown in FIG. 6.

However, in the case of a light-emitting diode 1 of the convergent type, the light intensity distribution will have a shape as shown in FIG. 5, which rapidly changes in the widthwise direction. Thus, when such a convergent type light-emitting diode 1 is used as a light source of an image reading system for correcting the white level of the surface $P_2$ of an original 3 using the light intensity level of the light reflected at the reflecting surface $P_1$ of a white level reference 2, if the optical axis of the light-emitting diode 1 is aligned with the reflecting surface $P_1$ of the white level reference 2 as shown in FIG. 6, the light intensity level is a maximum at the reflecting surface $P_1$ of the white level reference 2; however, the light intensity level at the surface $P_2$ of the original 3 becomes significantly reduced as shown in FIG. 5. As a result, a white level detected by a photoelectric element 4 will differ between the reflecting surface $P_1$ of the white level reference and the surface $P_2$ of the original 3, as shown in FIG. 7. Accordingly, if the original 3 has a half-tone image, the leading margin of the original 3 will be read as a black area, which is disadvantageous.

Figure 8:
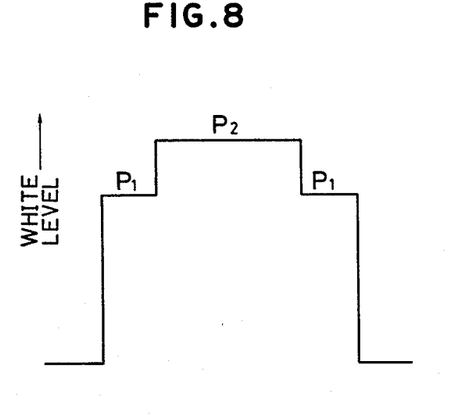

On the other hand, if the optical axis of the light-emitting diode 1 is aligned with the surface $P_2$ of the original 3 as shown in FIG. 6, the light intensity level at the surface $P_2$ of the original 3 is at maximum; however, the light intensity level at the reflecting surface $P_1$ of the white level reference 2 is set at a significantly low level, as shown in FIG. 5. In this case also, a white level detected by the photoelectric element 4 will differ significantly between the reflecting surface $P_1$ of the white level reference 2 and the surface $P_2$ of the original 3, as shown in FIG. 8. As a result, if the original 3 has a half-tone image, the left and right margins of the original 3 will be read as black areas.

SUMMARY OF THE INVENTION

In accordance with the principle of the present invention, there is provided an image reading system which comprises a light source having a light distribution in a transverse direction normal to an irradiation axis. The light source is oriented such that its irradiation axis passes through a point which is a mid-point or substantially a mid-point between a surface of a white level reference and a surface of an original. In the preferred embodiment, the light source is a light-emitting diode array including a plurality of light-emitting diodes arranged in a line. More preferably, the light-emitting diode is of the convergent type.

It is therefore a primary object of the present invention to obviate the disadvantages of the prior art as described above and to provide an improved image reading system.

Another object of the present invention is to provide an improved image reading system using a light source having a light intensity distribution in a transverse direction transverse to an irradiation axis of the light source.

A further object of the present invention is to provide an improved optical image reading system using a light-emitting diode array as a light source.

A still further object of the present invention is to provide an improved image reading system capable of setting a white level reference properly using a semiconductor light-emitting device as a light source.

A still further object of the present invention is to provide an optical image reading system compact in size, high in performance and simple in structure.

Other objects, advantages and novel features of the present invention will become apparent from the following detailed description of the invention when considered in conjunction with the accompanying drawings.

DESCRIPTION OF THE PREFERRED EMBODIMENTS

Figure 1:
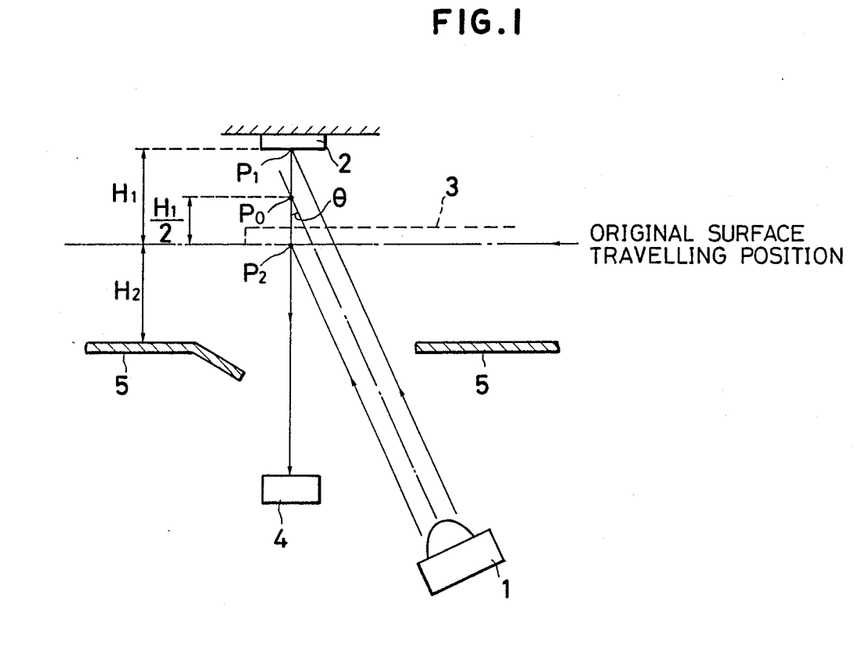
FIG. 1 is a schematic illustration showing an image reading system constructed in accordance with one embodiment of the present invention.

Referring now to FIG. 1, there is schematically shown an image reading system constructed in accordance with one embodiment of the present invention. The illustrated image reading system is suitable for use as an input unit of various imaging apparatuses, such as facsimile machines, for reading an original image. As shown, the image reading system includes a light source 1 of the non-divergent type, which emits light substantially in parallel along its irradiation axis which is defined by an optical axis of the light source 1 or in a convergent manner. Thus, the light source 1 emits light which has a light intensity level distribution (similar to the Gaussian distribution) in a transverse direction which is normal to the irradiation axis of the light source 1. In the preferred embodiment, use is made of a light-emitting diode array as the light source 1. Preferably, the light-emitting diode array 1 includes a plurality of light-emitting diodes of the non-divergent type, most preferably convergent type light-emitting diodes. It is to be noted that the light-emitting diode array 1 is elongated in shape and its extends in a direction perpendicular to the surface of FIG. 1.

The image reading system also includes a white level reference 2 typically comprised of a piece of white tape or paper and the white level reference 2 is provided fixed in position, for example, as attached to a housing of the image reading system. Also provided in the image reading system is an image sensor or photoelectric element 4 disposed to receive the light reflecting from the white level reference. The image sensor 4 is also so disposed to receive light reflecting from an original 3 which is being advanced along its predetermined path. In the structure shown in FIG. 1, a travelling path for travelling an original 3 to be read is indicated as the one-dotted line which extends straight horizontally. Although not shown specifically, it should be noted that a plurality of transportation rollers are disposed to guide the original 3 along a predetermined transportation path. As the original 3 travels along the predetermined travelling path, the light emitted from the light-emitting diode array 1 is reflected by the surface of the original and the light reflecting from the original 3 is received by the image sensor 4.

Figure 2:
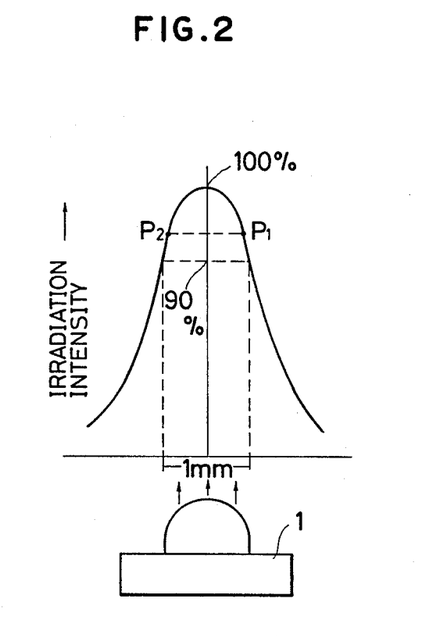
FIG. 2 is an illustration showing a light intensity level distribution of the light emitted by a light-emitting diode provided in the image reading system of FIG. 1.

The light-emitting diode array 1 emits light which has a light intensity distribution in a transverse direction normal to an optical axis or irradiation axis of the array 1, as shown in FIG. 2. Since the light-emitting diode array 1 is of the convergent type, the light emitted from the array 1 is substantially in parallel, and the light intensity distribution in the transverse direction is similar to the normal or Gaussian distribution. Thus, the light intensity level is at maximum along the irradiation axis and the light intensity level drops dramatically in the transverse direction from the irradiation axis. Of importance, in the structure shown in FIG. 1, the light-emitting diode array 1 is so oriented that the irradiation axis of the light-emitting diode array 1 passes between a point $P_1$ at the reflecting surface of the white level reference 2 and a point $P_2$ where the surface of the original 3 passes. The point $P_1$ is defined as a cross point between the reflecting surface of the white level reference 2 and a hypothetical vertical line passing through the center of the image sensor 4. And, the point $P_2$ is defined as a cross point between the travelling path of the bottom surface of the original 3 and the hypothetical vertical line passing through the center of the image sensor 4. In the preferred embodiment, the irradiation axis of the light-emitting diode 1 is so disposed that its irradiation axis passes through a mid-point $P_0$ between these two points $P_1$ and $P_2$. In the illustrated embodiment, the image sensor 4 is disposed opposite to the white level reference 2 and thus the straight line connecting the centers of the white level reference 2 and the image sensor 4 defines a vertical line. The light-emitting diode array 1 is disposed to the left of the image sensor 4, so that the light emitted from the light-emitting diode array 1 is incident upon the white level reference and also upon the original 3 at an incident angle of $\theta$.

Figure 3:
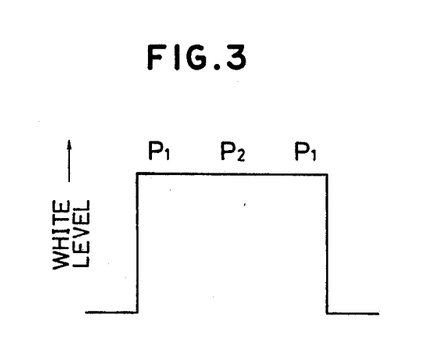
FIG. 3 is an illustration showing the output waveform of a white level signal detected in the image reading system of FIG. 1.

With the above-described structure, since the irradiation axis of the light-emitting diode array 1 passes through the mid-point $P_0$ between the reflecting surface of the white level reference 2 and the travelling path of the bottom surface of the original 3, the light intensity level remains the same at points $P_1$ and $P_2$ even if incident angle $\theta$ varies (see FIG. 2) In other words, light intensity levels detected by the image sensor 4 at point $P_1$ and $P_2$ are identical. Thus, if the white level reference 2 is longer than the width of the original 3 having a white surface, there is obtained a detected light intensity level from the image sensor 4 as shown in FIG. 3. In the detected light intensity level shown in FIG. 3, the central portion, which is indicated by $P_2$, indicates the light intensity level for the light reflecting from the original 3 and the end portions, which are indicated by $P_1$, indicate the light intensity level for the light reflecting from the white level reference 2.

If the incident angle $\theta$ is made smaller or the spacing $H_1$ between the reflecting surface of the white level reference 2 and the surface of the original 3 is made smaller, the spacing between the irradiation axis of the light-emitting diode array 1 and the point $P_1$ at the reflecting surface of the white level reference 2 and also the spacing between the irradiation axis of the light-emitting diode array 1 and the point $P_2$ at the travelling surface of the original 3 are made smaller, so that the light intensity levels at points $P_1$ and $P_2$ are increased. In order to secure proper and clear reading of the original 3 at point $P_2$ by the image sensor 4, the light intensity level at points $P_1$ and $P_2$ is required to be set at 90% or more of the maximum light intensity at the irradiation axis. And, a width of the light intensity level distribution in the transverse direction, which allows to obtain 90% or more of the maximum light intensity at the irradiation axis is in the order of 1 mm as shown in FIG. 2. On the other hand, the height $H_1$ is a spacing which is necessary for transportation of the original 3, and, this spacing $H_1$ is determined in consideration of the thickness of the original 3 to be read.

Accordingly, once a light intensity level to be set at points $P_1$ and $P_2$ has been determined, the width of the light intensity distribution in the transverse direction is automatically determined. In addition, height $H_1$ can also be easily determined because it is a simple choice of design in relation to the original 3 to be read. As a result, the incident angle $\theta$ can be easily determined. As indicated previously, since the light intensity level at points $P_1$ and $P_2$ move closer to the maximum level as the incident angle $\theta$ is made smaller, so that the light-emitting diode array 1 is preferably disposed closer to the image sensor 4. And, both of the light-emitting diode array 1 and the image sensor 4 may be provided as a unit in an integrated form, if desired.

In the image reading system shown in FIG. 1, a pair of guide plates 5 is also provided below the travelling path for the original 3. A height $H_2$ is travelling defined as a spacing between the travelling path for the original 3 and the pair of guide plates 5. If the transportation rollers (not shown) are provided as disposed closer to an original reading section, which is defined around point $P_2$, the original 3 is transported above the guide plates 5 ($H_2$ being larger than 0) as shown in FIG. 1. On the other hand, if it is so structured that the original 3 travels in contact with the guide plates 5, it is so set as $H_2=0$.

Figure 4:
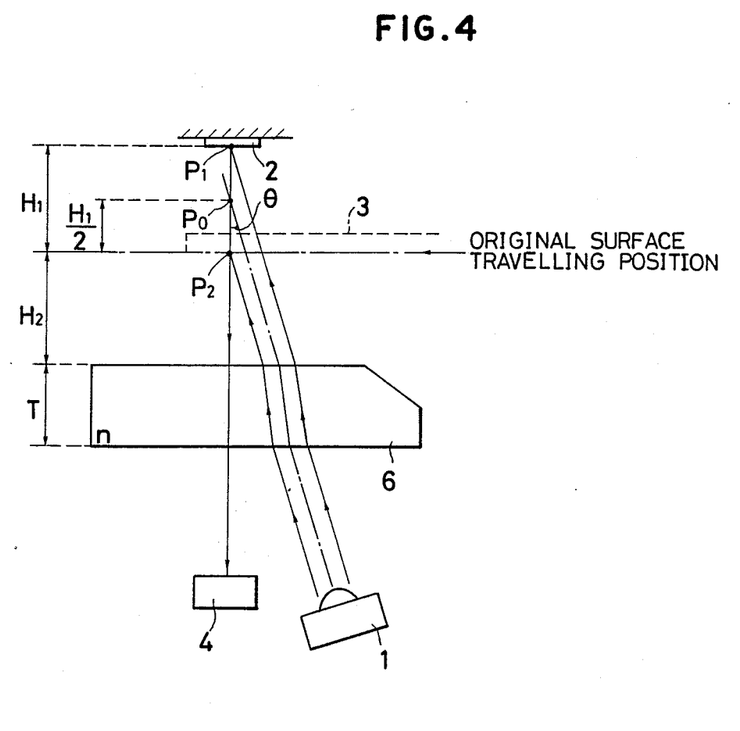
FIG. 4 is a schematic illustration showing an image reading system constructed in accordance with another embodiment of the present invention.

FIG. 4 shows an image reading system constructed in accordance with another embodiment of the present invention, and those elements which are identical to those elements shown in FIG. 1 are indicated by identical numerals. The image reading system of FIG. 4 includes a contact glass 6 having a refractive index n and a thickness T, and the contact glass 6 is provided in place of the guide plates 5 in the embodiment shown in FIG. 1. In the present embodiment, the light emitted from the light-emitting diode array 1 in parallel is refracted when passing through the contact glass 6 and then is incident upon points $P_1$ and $P_2$. Since the incident angle $\theta$ remains unchanged even if the light emitted from the light-emitting diode array 1 passes through the contact glass 6, all of the conditions remain the same except the fact that the light-emitting diode array 1 must be shifted in position toward the image sensor 4 by an amount corresponding to the refraction of the light by the contact glass 6. As a result, in the embodiment shown in FIG. 1, the light-emitting diode array 1 can be located closer to the image sensor 4.

As described above, in accordance with the above-described embodiments of the present invention, use may be made of a single light-emitting diode array for illuminating both of a white level reference and an original to be read substantially at the same light intensity or irradiation level. Thus, the number of components required for an image reading system may be reduced and the image reading system may be fabricated with a fewer number of steps, which contribute to lower the manufacturing cost. In addition, as the light intensity levels at the white level reference and the original both increase as the light-emitting diode array is located closer to the image sensor, so that the image reading system may be designed to be smaller in size. Moreover, the light-emitting diode array and the image sensor may be integrated into one unit, if desired, which additionally contributes to decrease the number of components and the number of manufacturing steps.

Figure 9:
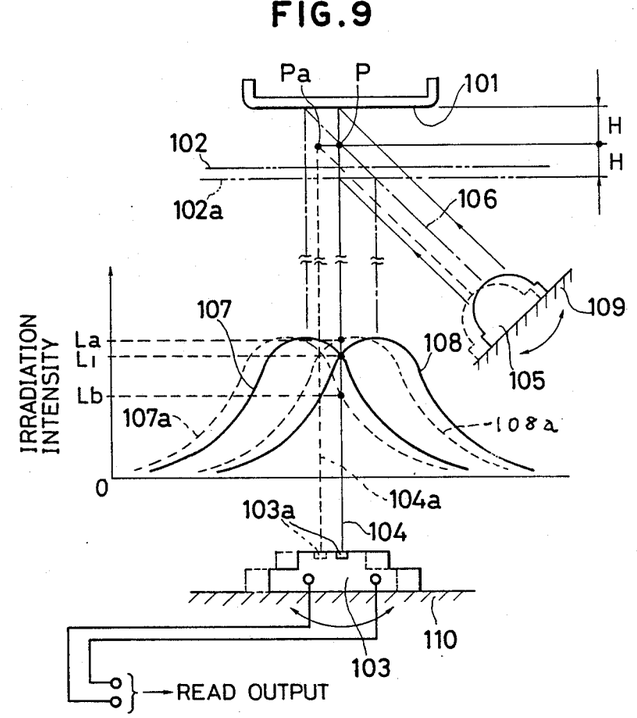
FIG. 9 is a schematic illustration which is useful for understanding the principle of determining a relative positional relationship between a light source and a photoelectric element in accordance with the present invention.

Referring now to FIG. 9, there is shown an image reading system constructed in accordance with the principle of the present invention. As shown, the present image reading system includes a white level reference 101, such as a white tape having a white surface, which is typically provided as fixedly attached to a housing of the image reading system. A white original 102 having a white surface 102a without image is transported through the present image reading system horizontally as guided, for example, by a plurality of transportation rollers (not shown) in a manner well known to those skilled in the art. An image sensor 103, typically comprised of a CCD, is disposed below and opposite to the white level reference 101 so as to receive the light reflecting from the white level reference 101 and also from the original 102, if the original 102 is present. The image sensor 104 has an image reading portion 103a, which is typically defined by a plurality of photoelectric elements arranged in the form of a straight line extending in the direction perpendicular to the surface of the drawing. A hypothetical vertical line extending straight upward from the image reading portion 130a is indicated by 104. Also provided in the present image reading system is a light source 105 which is preferably comprised of a convergent type light-emitting diode array and which emits light obliquely toward the white level reference 101 and the original 102. The light source 105 is preferably of the convergent type and the light emitted from the light source 105 has a light intensity or irradiation distribution which is similar to a normal or Gaussian distribution in a transverse direction which is normal to the irradiation or optical axis of the light source 5.

Figure 10:
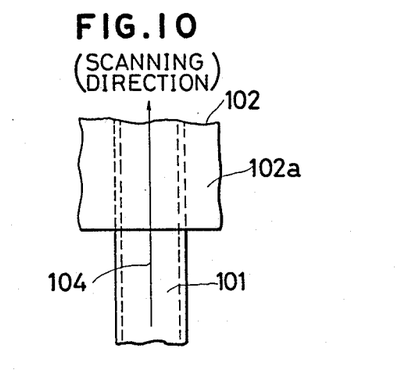
FIG. 10 is an illustration showing the positional relation between a white level reference and a white original in the optical scanning direction.

In the structure shown in FIG. 9, the white original 102 is so set that it can be read by the image reading portion 103a together with the white level reference 101. Described more in detail in this respect, as shown in FIG. 10, the white original 102 is set such that the white level reference 101 extends beyond the side edges of the white original 102 in the optical scanning direction (main scanning direction) of the original reading portion 103a when viewed upward from the image sensor 103. The light emitted from the light source 105 is reflected by the white level reference 101 and also by the white original 102 and the reflected light is received by the image sensor 103. In this case, however, only that portion of the reflected light which enters the image reading portion 103a is effectively read.

In FIG. 9, an ideal relative positional relationship between the light source 105 and the image sensor 103 is indicated by the solid lines. That is, as described previously, the light source 105 is so disposed that its irradiation axis 106, where the light intensity is at maximum, passes through a point between the white level reference 101 and the surface 102a of the original 102, and, in the preferred embodiment, the irradiation axis 106 passes through a mid-point P between the white level reference 101 and the surface 102a of the original 102. In FIG. 9, the mid-point P is defined as a point at the center between the white level reference 101 and the surface 102a of the original 102 along the vertical line 104 extending straight vertically from the image reading portion 103a. The light intensity level distributions of the light reflected at the white level reference 101 and at the surface 102a of the original 102 are indicated by solid lines 107 and 108, respectively, and the light intensity level read by the image reading portion 103a will be $L_1$ for both of the light reflected from the white level reference 101 and the original surface 102a.

If the light source 105 were located at a position indicated by the dotted line as shifted in postion from its ideal position indicated by the solid line on its mounting surface 109, the light intensity level read by the image reading portion 103a would differ between the light reflected from the white level reference 101 and the light reflected from the original surface 102a. That is, as the light source 105 is shifted in position sideways, the light intensity level distributions for the light reflecting from the white level reference 101 and for the light reflecting from the original surface 102a will be shifted as indicated by the dotted lines 107a and 108a, respectively. As a result, the light intensity level read by the image reading portion 103a for the light reflecting from the white level reference 101 will decrease to Lb from $L_1$; whereas, the light intensity level read by the image reading portion 103a for the light reflecting from the original surface 102a will increase to La from $L_1$, so that a balance in light intensity will be lost.

Figure 11:
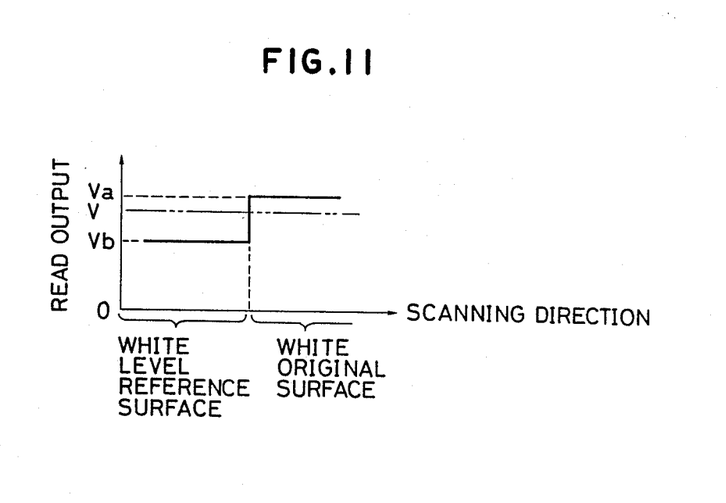
FIG. 11 is an illustration which is useful for understanding how to determine a propore positional relation between the light source and the photoelectric element in the structure shown in FIG. 9.

In the structure shown in FIGS. 9 and 10, since both of the white level reference 101 and the original surface 102a are optically scanned at the same time, an output from the image sensor 103 will have a level Vb for the light reflecting from the white level reference 101 and a level Va for the light reflecting from the original surface 102a, as shown in FIG. 11. Under the condition, by comparing the output portions for the light reflecting from the white level reference 101 and also for the light reflecting from the original surface 102a, the position of the image sensor 103 on its mounting surface 110 may be adjusted so as to make Va and Vb equal in level. In the illustrated example, by moving the image sensor 103 to the left such that the vertical line 104a passes through a mid-point Pa which is a cross point between the irradiation axis of the light source 105 located as indicated by the dotted line and the center line between the white level reference 101 and the original surface 102a, both of the light intensity levels read by the image sensor become identical at V. Of course, such an adjustment may be carried out by moving the light source 105 instead of the image sensor 103, or, alternatively, by moving both of the light source 105 and the image sensor 104. Furthermore, such an adjustment can also be effected by rotating either one or both of the image sensor 104 and the light source 105 in addition to or in replacement with the above-described translational motion.

As described above, in accordance with the present invention, by adjusting the optical relative positional relationship and/or relative angular relationship between the image sensor 104 and the light source 105 so as to equalize light intensity levels of the light reflecting from the white level reference 101 and the light reflecting from the original surface 102a while comparing the output portions from the image sensor 103, a white level adjustment of the image reading system can be carried out with extreme ease. A read output from the image sensor 103 may be displayed in any desired format, analog or digital, and, as an example, this read output may be displayed as a video waveform.

Figure 12:
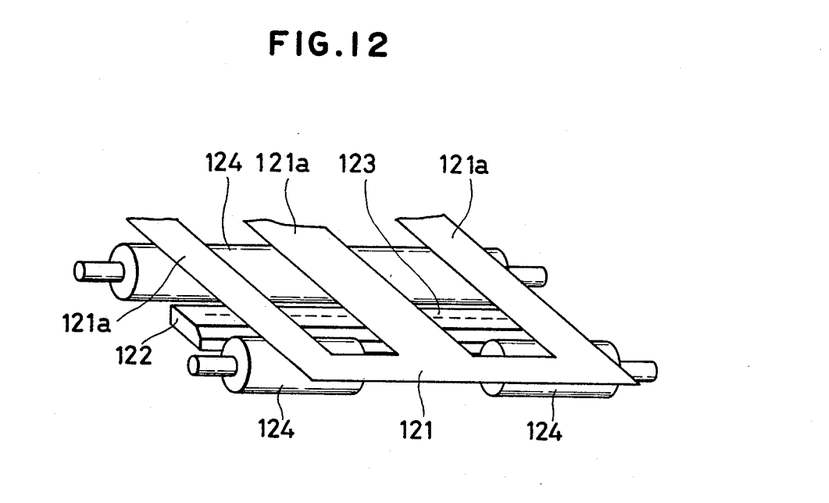
FIG. 12 is a schematic illustration showing in perspective an image reading system constructed in accordance with one embodiment of the present invention.

Referring now to FIG. 12, there is shown an image reading system constructed in accordance with another embodiment of the present invention. A white original 121 having an all white bottom surface may be transported through the present image reading system and an image reading section 123 is defined between the white original 121 and a contact glass 122. The white original 121 is transported in an auxiliary scanning direction, which is normal to the main or optical scanning direction, by transportation rollers 124. In the illustrated example, the white original 121 includes three elongated belt portions 121a which extend in the auxiliary scanning direction, and the white original 121 is optically read in the main or optical scanning direction at the image reading section 123.

Figure 13:
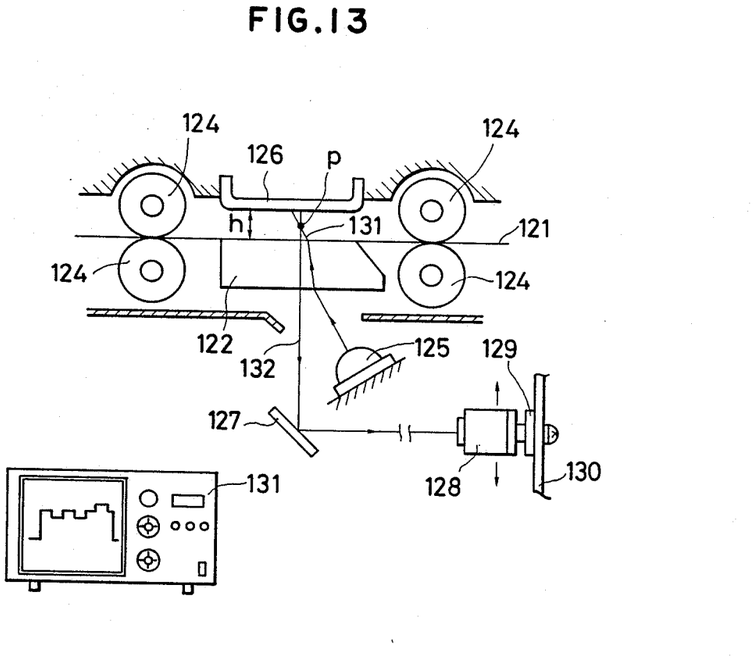
FIG. 13 is a schematic illustration showing the image reading system of FIG. 12 in more detail.

FIG. 13 illustrates the further detailed structure of the image reading system of FIG. 12, and a light-emitting diode array 124 as a light source is disposed below the contact glass 122. A white level reference 126 is provided as fixed in position as located immediately above the contact glass 122. The white level reference 126 has a bottom surface which is all white to determine an light intensity level reference when light is reflecting from a white surface. A reflecting mirror 127 is disposed so as to reflect the light from the white level reference 126 and/or the original 121 toward a CCD image sensor through an lens system 128. The image sensor is mounted on a sensor board unit (SBU) 129 which in turn is mounted on a fixed plate 130, such as a housing of the image reading system. Also shown in FIG. 13 is a synchroscope 131 which is operatively coupled to the image sensor.

With the above-described structure, when image reading is carried out by activating the LED array 125, the white original 121 and the white level reference 126 are read alternately in the main or optical scanning direction. That is, the light emitted from the LED array 125 passes through the contact glass 122 upwardly and impinges upon the white original 121 and also upon the white level reference 126. The light reflecting from each of the white original 121 and the white level reference 126 passes through the contact glass 122 downwardly and is reflected by the mirror 127 to be incident upon the CCD image sensor (not shown in FIG. 13) mounted on the SBU 129 through the lens system 128. The light received by the CCD image sensor is converted into an electrical signal which is then normally stored into an image memory through a CPU bus. In the present embodiment, a scanned output from the CCD image sensor is converted into a video waveform by the synchroscope 131.

Figure 14A:
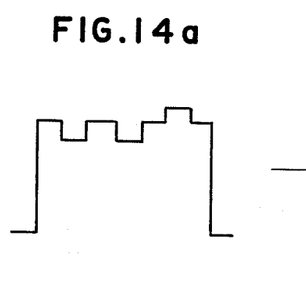
FIGS. 14a and 14b are illustrations showing video waveforms which are useful for explaining the operation of the structure shown in FIGS. 12 and 13.
Figure 14B:
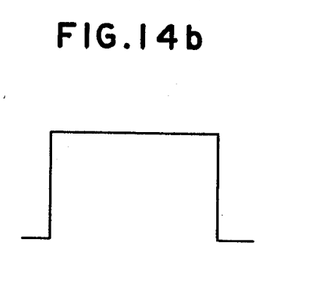
Figure 15:
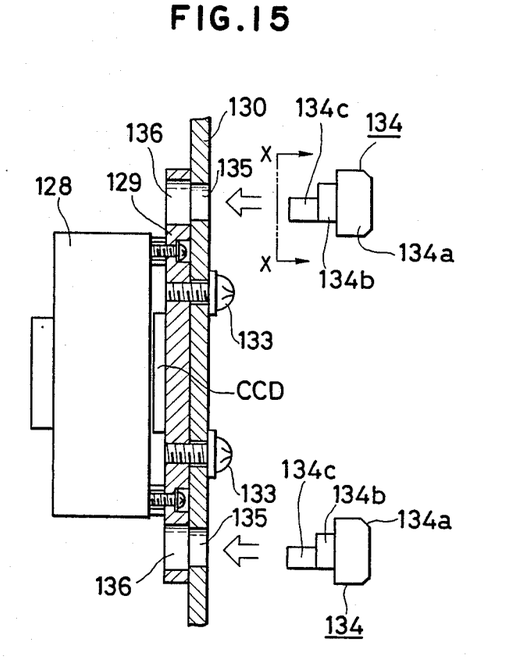
FIGS. 15 through 19 are schematic illustrations showing a structure for mounting an image sensor (CCD) and its associated optical system adjustably in position with respect to the irradiation axis of light emitted from a light-emitting diode array in the image reading system shown in FIGS. 12 and 13.
Figures 16, 17:
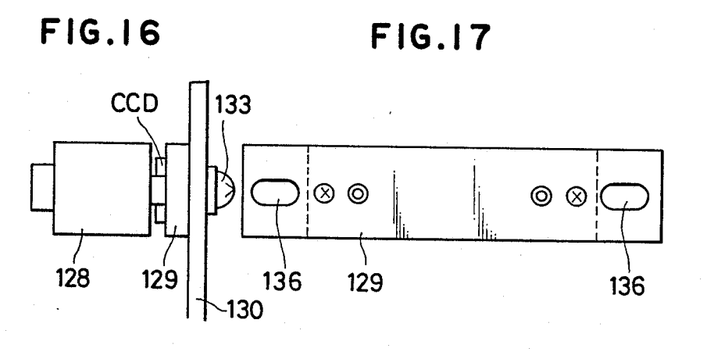

Now, if the LED array 125 is shifted in position form its ideal position as shown in FIG. 9, there is obtained a wavy video waveform shown in FIG. 14a, which indicates the fact that the optical relative positional relationship between the LED array 125 and the image sensor on the SUB 129 is deviated from its ideal condition. Under the condition, while observing the video waveform displayed on the synchroscope 131, the position of the SBU 129 and the lens system 128, which is integral with the SBU 129, on the fixed plate 130 is adjusted by moving the SBU on the fixed plate 130. Because of this, when the ideal condition for the optical relative positional relation between the LED array 125 and the image sensor on the SBU 129 is attained, there is obtained a flat video waveform as shown in FIG. 14b. Thus, under the condition of the flat video waveform of FIG. 14b, the SBU 129 is securely fastened to the fixed plate 130.

Figure 18:
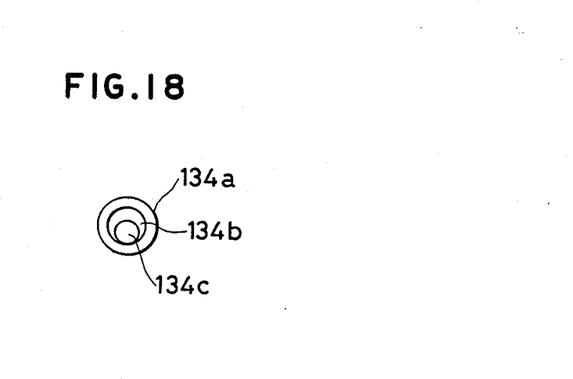

A mounting structure for mounting the SBU 129, which carries the CCD image sensor and the optical system 128, on the fixed plate 130 constructed in accordance with one embodiment of the present invention is illustrated in FIGS. 15 through 19. When mounting, in the first place, the SBU 129 is provisionally mounted on the fixed plate 130 using screws 133, and, then, a pair of adjustment pins 134 is inserted into a pair of holes 135 of the fixed plate 135, respectively. from the rear side of the fixed plate 130. The adjustment pin 134 includes a knob section 134a, a first section 134b, which is fitted into the corresponding hole 135 with an appropriate fit, and a second section 134c, which is off-centered with respect to the first section 134b as best shown in FIG. 18. Thus, when the first section 134b is fitted into the corresponding hole 135 of the fixed plate 130, the second section 134c is fitted into a corresponding slot 136 elongated in the horizontal direction and formed in the SBU 129.

Figure 19:
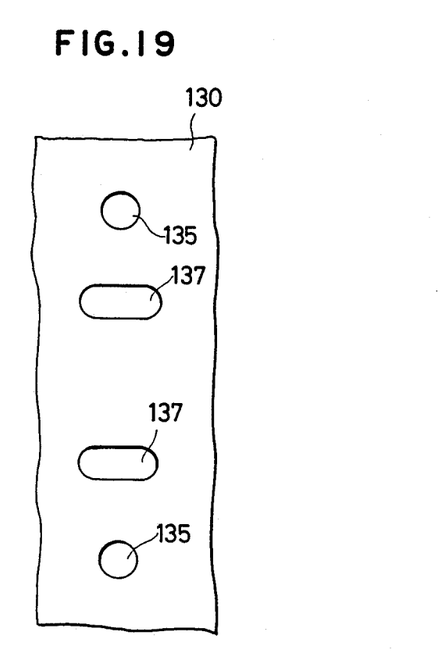

Under the condition, when the adjustment pin 134 is rotated by grabbing the knob section 134a, the off-centered second section 134c pushes an inner wall of the elongated slot 136 of the SUB 129, so that the SBU 129 may be moved up and down. In addition, by adjusting the rotational angle of each of the adjustment pins 134, the SBU 129 may be inclined in position. On the other hand, the fixed plate 130 is formed with a pair of sufficiently large slots 137, each of which receives therein a corresponding one of the screws 133, as shown in FIG. 19. Thus, the SUB 129 may be moved up and down or inclined while being provisionally mounted on the fixed plate 130 through the screws 133. Thus, during provisional mounting, the screws 133 keep the SBU 129 mounted on the fixed plate 130 but allows the SBU 129 to move with respect to the fixed plate 130 when one or both of the adjustment pins 134 is operated. When the flat waveform shown in FIG. 14b is obtained while operating the adjustment pins 134, the screws 133 are tightened to have the SBU 129 tightly and securely mounted on the fixed plate 130. In this manner, a white level adjustment of an image reading system can be carried out accurately and easily.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. An image reading system, comprising:
    an original transporting passage for transporting an original to be read along a predetermined path;
    a light source disposed at a first side of said predetermined path for emitting light in an irradiation direction, said light having a light intensity distribution decreasing in level in a transverse direction from said irradiation axis;
    a white level reference having a white surface, said white level reference being provided fixed in position at a second side, which is opposite to said first side, of said predetermined path;
    an image sensor for converting light information into an electrical signal, said image sensor being disposed at said second side for receiving light emitted from said light source and reflecting from said white level reference and/or said original being transported along said predetermined path; and
    whereby said irradiation axis of said light source passes between a first hypothetical point on said white surface of said white level reference and a second hypothetical point which is defined as an intersection between said predetermined path and a straight line extending between said first hypothetical point and said image sensor.

2. The system of claim 1, wherein said irradiation axis passes through a mid-point between said first and second hypothetical points.

3. The system of claim 1, wherein said light source includes a light-emitting diode array including a plurality of light-emitting diodes arranged in the form a single array.

4. The system of claim 3, wherein said light-emitting diode array is of a convergent type.

5. The system of claim 1, wherein a distance between said predetermined path and said white level reference is set larger than a largest thickness of said original so as to allow said original to be transported along said predetermined path.

6. The system of claim 1, further comprising guiding means for guiding said original as said original is transported along said predetermined path.

7. The system of claim 1, further comprising a contact glass through which the light emitted from said light source travels and the light reflecting from said white level reference and/or said original to be incident upon said image sensor travels through said contact glass.

8. The system of claim 1, further comprising a plurality of rollers for transporting said original along said predetermined path.

9. A method for adjusting a white level of an original based on a light intensity level of light reflecting from a white level reference in an image reading system using a convergent type light source and an image sensor, comprising the steps of:
    passing an all white original along a predetermined transportation path;
    optically reading light reflecting from said all white original to produce a first output and also light reflecting from said white level reference to produce a second output at the same time;
    displaying said first and second outputs; and
    adjusting a relative positional relationship between said light source and said image sensor while observing said first and second outputs displayed such that said first and second outputs are substantially equal in level.

10. The method of claim 9, wherein said first and second outputs are displayed as portions of a video waveform on a screen of a display device.

11. The method of claim 9, wherein said image sensor is moved to adjust the relative positional relation while keeping said light source unchanged in position.

12. The method of claim 9, wherein said light source is a light-emitting diode array.

* * * * *